United States Patent Office 2,799,684
Patented July 16, 1957

2,799,684

CRYSTALLINE COMPOUNDS OF TRYPTOPHANE AND METHODS OF MANUFACTURING THEM

Daniel Luzon Morris, Seattle, Wash., assignor to Food, Chemical and Research Laboratories, Inc., Seattle, Wash., a corporation of Washington No Drawing. Application June 18, 1954, Serial No. 437,867

26 Claims. (Cl. 260—319)

This is a continuation-in-part of my application for patent, Ser. No. 216,849, filed March 21, 1951, now abandoned.

This invention relates to amino acids and is more particularly concerned with compounds of tryptophane and with methods of making them.

Tryptophane is one of the ten or more amino acids which are known to be essential for human nutrition and the nutrition of most animals. Certain processes, now in use, for the preparation from proteins of mixtures of these amino acids are such that the tryptophane initially present in the proteins is destroyed. For this reason, there is need for preparations of pure tryptophane with which to supplement these mixtures for medicinal use, for nutritional research and for other purposes. In nutritional research, pure tryptophane is necessary for the preparation of mixtures of known composition.

By whatever method tryptophane is prepared, it is usually necessary to purify it after it has been obtained in the crude state. This is commonly done by recrystallization from such solvents as water, dilute alcohol, and other solvents. One difficulty encountered in such recrystallizations is the relatively high solubility of the tryptophane in the solvents used, which causes the loss of considerable quantities of tryptophane in the mother liquors.

One of the objects of this invention is the provision of a more effective and economical method for the purification of tryptophane.

Another object is the provision of compounds of tryptophane from which pure tryptophane can be readily obtained.

Other objects and advantages will appear from the following description.

I have found that when tryptophane is dissolved in an aqueous solution of a fatty acid, and allowed to crystallize therefrom, the crystals that separate are not of tryptophane alone, but a new chemical compound containing tryptophane, the fatty acid and, sometimes, water. In the case of acetic, propionic and butyric acids, the crystals in each case contain one mol of the fatty acid and one mol of water for each mol of tryptophane. In the case of formic and caproic acids, the relationship is the same, except that water is absent.

In general, the reaction mixture should comprise an excess of undissociated fatty acid. That is, it should contain more undissociated fatty acid than required for the formation of the complex on an equimolal basis.

In the case of acetic acid, the pH should be at or below about 4.7, because the complex will not form if the pH is much above 4.7. In the case of propionic acid, the optimum pH is about 4.6.

The compound containing acetic acid as the fatty acid is typical of an entire series of compounds of the various fatty acids and has the following properties:

*Crystal habit.*—The compound crystallizes generally in the form of thin plates. These may be six-sided, with all the angles approximately 120°, or one or more faces may be suppressed, resulting in acute angles of about 60°. These crystals are very strongly birefringent.

*Stability.*—The crystals may be dried in a vacuum at room temperature in the presence of an effective drying agent, such as concentrated sulfuric acid. If they are kept in this dry atmosphere, either at atmospheric or at reduced pressure, they are stable for a period of several days, the crystals retaining their birefringence and the chemical composition remaining substantially unchanged. If, however, the crystals are warmed somewhat, say, to 65° C., or higher, either in the air or in a vacuum, they rapidly decompose, losing both water and acetic acid and leaving a residue of pure tryptophane. This decomposition also occurs within about a day at room temperature, if the crystals are not kept in a dry atmosphere. The crystals will also decompose almost instantly if they are placed in contact with a solvent such as alcohol or water in each of which acetic acid is soluble.

*Composition.*—If the dry crystals are heated for about 30 minutes at about 75° C. in a vacuum in the presence of solid sodium hydroxide, they are found to lose very nearly 27.5% of their weight. This is the theoreteical weight loss for a compound containing one molecule each of tryptophane, water and acetic acid. If a weighed sample of the crystals is dissolved in a measured quantity of dilute sodium hydroxide and the excess alkali then determined by titration, it is found that the amount of alkali consumed (giving due consideration to the weakly acidic character of the tryptophane itself) is equivalent to a quantity of acetic acid representing approximately 21.3% of the weight of the crystals, which is the calculated quantity of the acetic acid in the crystalline composition.

*Solubility.*—If solutions of tryptophane are made up in aqueous acetic acid of varying acid concentrations, and the excess tryptophane-acetic acid compound allowed to crystallize out at about 0° C. (i. e., in a refrigerator), it is found that the mother liquor contains tryptophane in quantities varying in a continuous way with the concentration of the acetic acid. As this acid concentration increases from 0, the solubility at first decreases. It reaches a minimum value at about 15% acid, and then increases steadily. This minimum value is of the order of 0.2 to 0.3% tryptophane in the solution. If, however, the concentration of the acetic acid is kept constant, and the pH of the solution increased by adding to it sodium or ammonium acetate, there is a decrease in the solubility of the crystals to a value of 0.10–0.15% at 0° C.

This tryptophane-acetic acid compound is a new composition of matter in the nature of an addition product. It is not a mere salt, such as is known to exist in the case of tryptophane and hydrochloric acid, because in the case of the well-known hydrochloride salt, for example, the stability of the salt increases and, therefore, its solubility decreases, as the hydrochloric acid concentration of the solution increases and as the pH decreases. This is because, as the pH decreases, the tryptophane will be converted more and more into its cationic form which can enter a crystal lattice with the anionic chloride ion. But in the case of the compound of the present invention, the solubility decreases only until a definite concentration of acid is reached. It then increases. More notably, the solubility decreases as the pH rises, that is, as the tryptophane approaches its least ionized or zwitterionic form.

No other amino acid is known to form compounds of the type described herein with acetic acid. This makes it possible to separate tryptophane from mixtures of amino acids merely by adding acetic acid to an aqueous solution of the mixture and then cooling the solution to crystallize out the tryptophane-acetic acid compound.

In the case of propionic and butyric acids, the tryptophane compounds are exactly analogous to those with acetic acid. The crystals are stable at room temperature in a dry atmosphere and can be decomposed readily at elevated temperatures or in the presence of moisture. The crystal forms of all these compounds are alike. In fact, they are almost indistinguishable under the microscope. It is observed, however, that crystals of tryptophane-acetic acid will dissolve rapidly in a 10% solution of propionic acid and, similarly, crystals of tryptophane-propionic acid in a solution of acetic acid, whereas these same crystals will remain undissolved each in its own corresponding acid.

In the case of the compound containing tryptophane and formic acid, the crystals obtained are long and very thin needles. They are also highly birefringent and stable in a dry atmosphere. They are, however, relatively resistant to decomposition. They may be heated indefinitely at 75° C. in a vacuum in the presence of sodium hydroxide without loss of weight. However, if the temperature is raised to 115° C., there occurs in about 30 minutes a loss in weight of 18.4%, corresponding to one molecule of formic acid per molecule of tryptophane.

The compound containing tryptophane and caproic acid is similar in form and composition to the one containing tryptophane and formic acid. That is, the crystals form as birefringent needles which will decompose at elevated temperatures in a vacuum to set free caproic acid. The weight loss under these conditions is indicative of a composition of one molecule of caproic acid to one of tryptophane.

Similar compounds may be formed by using higher members of the fatty acid series.

If one equivalent of benzoic acid (calculated from the tryptophane) is added to a 2% aqueous solution of tryptophane, there occurs copious crystal formation. These crystals resemble neither those of tryptophane nor those of benzoic acid. Similarly, in the case of tryptophane and lactic acid, the combination produces, in the presence of high concentrations of the acid, birefringent needles which are neither those of tryptophane nor those of lactic acid.

Tryptophane exists in two forms, namely, the dextro and levo. It may also exist as mixtures of these two forms. Mixtures of equal parts of D and L tryptophane, commonly referred to as racemic or DL tryptophane, form crystalline compounds exactly analogous to those formed by the L, or natural, tryptophane. In the case of the acetic acid compound of DL tryptophane, the crystals that form are somewhat different sometimes in shape from those of the compound of L tryptophane. The latter are those previously described herein, whereas the former may sometimes occur as four-sided platelets, with nearly right angles, although they are also sometimes obtained in a form indistinguishable from that of the L compound.

The following is illustrative of the method by which the compounds of this invention may be prepared:

*Example 1*

Two grams of L tryptophane were dissolved in 100 ml. of hot water. To this solution there was added 10–20 ml. of glacial acetic acid and 2–10 grams of sodium acetate. The solution was cooled and then stirred vigorously while the sides of the container were scratched. A heavy crop of white crystals of the tryptophane-acetic acid-water compound separated. The suspension of crystals was allowed to stand in the refrigerator over night and the crystals then filtered off and washed with ice-cold dilute acetic acid (5–20%). The crystals after being dried in a vacuum desiccator at room temperature, weighed about 2.4 grams. The crystals were then dried at 65° C. in a vacuum over sodium hydroxide which resulted in a residue of 1.7 grams of pure tryptophane. The same results are obtained if the drying is effected in an air oven.

*Example 2*

To 2.5 of a 2% solution of tryptophane were added 0.1 cc. of caproic acid and 1 cc. of a solution of sodium caproate (20% caproic acid plus a slight excess of sodium hydroxide). The mixture was clear when warm, but cloudy with caproic acid droplets when cold. The mixture was seeded with some caproic acid-tryptophane complex made from an excess of tryptophane plus caproic acid.

Crystals separated among the caproic acid droplets. These were brilliantly birefringent with crystal angles very nearly 90°. A fair number of the crystals showed a chopped-off corner with the two obtuse angles unequal. The precipitation was massive.

*Example 3*

To solutions of 10.0 mg. of tryptophane in 2 cc. of water, 0.3 ml. of propionic acid was added, then varying amounts of 40% sodium propionate solution according to the following schedule:

|  | 1 | 2 | 3 | 4 | 5 | 6 |
|---|---|---|---|---|---|---|
| Sodium propionate solution (cc.) | 0 | 0.01 | 0.05 | 0.2 | 0.5 | 1.0 |
| Approximate pH | 2.5 | 2.8 | 3.5 | 4.2 | 4.6 | 4.9 |
| Tryptophane in supernatant liquor after 48 hours @ 0° C. (in mg./cc.) |  |  | 1.0 |  | 0.70 | 0.84 |

The optimum pH appeared to be about 4.6.

*Example 4*

Ten milligrams of tryptophane was dissolved in 0.3 ml. of 85% formic acid. To this was added 0.3 ml. of one normal sodium hydroxide solution followed by 0.1 ml. of saturated (52%) sodium hydroxide solution. On cooling to 0° C. the complex separated as long fine needles with apparently square ends and was found to be strongly birefringent.

*Example 5*

One hundred forty milligrams of tryptophane-acetic acid was dissolved in 4 cc. of water plus 2 cc. of saturated sodium hydroxide solution. The solution was cooled and 4 cc. of 85% formic acid was added. It was then seeded and held at 0° C. for 48 hours. On filtering, 40.4 milligrams of tryptophane-formic acid crystals were obtained. These, after drying in a vacuum desiccator, assayed for one mol of tryptophane to one mol of formic acid with no water of crystallization.

Having thus described my invention, what I claim is:

1. A composition of matter comprising in crystalline form tryptophane chemically combined with an organic acid on a substantially equimolal basis, said organic acid being selected from the group consisting of formic, acetic, propionic, butyric, caproic and benzoic.

2. A composition of matter comprising in crystalline form tryptophane chemically combined with a fatty acid on a substantially equimolal basis, said fatty acid having the general formula $C_nH_{2n}O_2$ in which $n$ is an integer not greater than 6.

3. A composition of matter comprising in crystalline form tryptophane chemically combined on a substantially equimolal basis with a fatty acid of the general formula $C_nH_{2n}O_2$ in which $n$ is an integer not greater than 5.

4. A composition of matter comprising in crystalline form tryptophane chemically combined with acetic acid and water on an equimolal basis.

5. A composition of matter comprising in crystalline form tryptophane chemically combined with propionic acid and water on an equimolal basis.

6. A composition of matter comprising in crystalline form tryptophane chemically combined with butyric acid and water on an equimolal basis.

7. A composition of matter comprising in crystalline form tryptophane chemically combined with formic acid on an equimolal basis.

8. A composition of matter comprising in crystalline form tryptophane chemically combined with caproic acid on an equimolal basis.

9. A composition of matter comprising in crystalline form a whole molecule of tryptophane chemically combined with a whole molecule of an organic acid, said organic acid being selected from the group consisting of formic, acetic, propionic, butyric, caproic and benzoic.

10. A composition of matter comprising in crystalline form a whole molecule of tryptophane chemically combined with a whole molecule of a fatty acid, said fatty acid having the general formula $C_nH_{2n}O_2$ in which $n$ is an integer not greater than 6.

11. A composition of matter comprising in crystalline form a whole molecule of tryptophane chemically combined with a whole molecule of acetic acid and a whole molecule of water.

12. A composition of matter comprising in crystalline form a whole molecule of tryptophane chemically combined with a whole molecule of propionic acid and a whole molecule of water.

13. A composition of matter comprising in crystalline form a whole molecule of tryptophane chemically combined with a whole molecule of butyric acid and a whole molecule of water.

14. A composition of matter comprising in crystalline form a whole molecule of tryptophane chemically combined with a whole molecule of formic acid.

15. A composition of matter comprising in crystalline form a whole molecule of tryptophane chemically combined with a whole molecule of caproic acid.

16. The method of forming a crystalline compound having whole molecules of tryptophane combined with a whole molecule of a fatty acid comprising adding to an aqueous solution of tryptophane a fatty acid of the general formula $C_nH_{2n}O_2$ in which $n$ is an integer from 1 to 6, in an amount and concentration to provide an excess of undissociated fatty acid, permitting crystallization to take place, and separating out the resulting crystals.

17. The method as defined by claim 16 in which the fatty acid is acetic acid and the pH of the solution is adjusted to below about 4.7.

18. The method as defined by claim 16 in which the fatty acid is propionic acid.

19. The method as defined by claim 16 in which the fatty acid is caproic acid.

20. The method as defined by claim 16 in which the fatty acid is formic acid.

21. The method of purifying crude tryptophane comprising dissolving the crude tryptophane in water, adding to the solution a fatty acid of the general formula $C_nH_{2n}O_2$ in which $n$ is an integer from 1 to 6, in an amount and concentration to provide an excess of undissociated fatty acid in relation to equimolar portions of the tryptophane and fatty acid, permitting crystallization to take place, whereby whole molecules of tryptophane will be combined with whole molecules of the acid, separating the resulting crystals and decomposing them into their tryptophane and fatty acid components, and then separating the tryptophane from the fatty acid by evaporating the latter.

22. The method of separating tryptophane from a mixture thereof with other amino acids, comprising adding to the mixture a fatty acid of the general formula $C_nH_{2n}O_2$ in which $n$ is an integer from 1 to 6, in an amount and concentration to provide an excess of undissociated fatty acid in relation to equimolar portions of the tryptophane and fatty acid, permitting crystallization to take place, whereby whole molecules of tryptophane will be combined with whole molecules of the acid, separating the resulting crystals and decomposing them into their tryptophane and fatty acid components, and then separating the tryptophane from the fatty acid by evaporating the latter.

23. The method as defined by claim 22 in which the fatty acid is acetic acid and the pH of the solution is adjusted to below about 4.7.

24. The method as defined by claim 23 in which the crystals are decomposed by heat.

25. The method as defined by claim 23 in which the crystals are decomposed by dissolving them in water.

26. The method as defined by claim 23 in which the crystals are decomposed by dissolving them in a solvent.

References Cited in the file of this patent

UNITED STATES PATENTS

| | | |
|---|---|---|
| 2,511,867 | Neuberg et al. | June 20, 1950 |
| 2,557,041 | Weisblat et al. | June 12, 1951 |
| 2,557,920 | White | June 19, 1951 |
| 2,583,010 | Opie et al. | Jan. 22, 1952 |

OTHER REFERENCES

Biochemical Jour., vol. 7, pp. 107–8 (1913).